United States Patent [19]
Casola

[11] Patent Number: 5,928,524
[45] Date of Patent: Jul. 27, 1999

[54] OIL-WATER SEPARATOR

[75] Inventor: Eugene Charles Casola, BelAir, Md.

[73] Assignee: Hoover Containment, Inc., Glen Burnie, Md.

[21] Appl. No.: 09/050,021

[22] Filed: Mar. 30, 1998

Related U.S. Application Data

[60] Provisional application No. 60/042,465, Mar. 31, 1997.
[51] Int. Cl.⁶ .............................. B01D 21/00; C02F 1/40
[52] U.S. Cl. ......................... 210/802; 210/236; 210/241; 210/320; 210/521; 210/532.1; 210/DIG. 5
[58] Field of Search ...................................... 210/799, 800, 210/801, 802, 803, 236, 241, 320, 521, 522, 532.1, DIG. 5

[56] References Cited

U.S. PATENT DOCUMENTS

| | | |
|---|---|---|
| 4,722,800 | 2/1988 | Aymong . |
| 5,296,150 | 3/1994 | Taylor . |
| 5,520,825 | 5/1996 | Rice . |

OTHER PUBLICATIONS

AFL Industries Inc. Product bulletin, "Vertical Tube Coalescing Separator (VTG) 100–3,600 GPM", (1992).
AFL Industries Inc. Brochure, "Industrials and Municpal Problem Solvers".
Common Sense recovery Brochure, "Why Spend A Fortune? Use Common Sense Recovery".
Facet Quantek Brochure, "Facet Quantek ROWS Series Coalescing Plate Separators to Reduce Oil Content in Water to 15ppm or Less".
Facet Quantek Brochure, "Coalescing Plate Separators for Environmental Clean–up and Ressource Recovery", (1991).
General Industries, Inc. Brochure, "Helping Maintain Our Water as a Useable Resource in Compliance with Gonvernmental Regulatory Standards".
McTighe Brochure "Oil Water Separator, Designed for Separation of Free Oils and For Free Spill Requirements", (1984).
Monarch Separators, Inc. Brochure "Economical Gravity Operated Corrugated Plate Separators".
Oldcastle Brochure, "When You Choose an Oil Water Separator, Make Sure You Get One Basic Fact".
Tank Engineering Specialists, Inc. Brochure "Oil Water Separator for Today and Tomorrow".
Highland Tank Oil Water Separatot Brochure, (1987).

*Primary Examiner*—Robert J. Popovics
*Attorney, Agent, or Firm*—Crowell & Moring LLP

[57] ABSTRACT

A method and apparatus for separating immiscible liquids and solids from a influent stream employing a pre-coalescing unit to remove solids and larger liquid particles followed by a coalescing function which separates any remaining oil, grease and the like from the influent stream. The separator tank comprises three chambers, one of which comprises a series of debris plates made of perforated oleofilic material which traps solids and large particles in the first chamber and passes the partially separated liquid to a second chamber containing closely spaced coalescer plates which remove the remaining unwanted particles. In the third chamber, the effluent stream is prepared for reintroduction into the environment. The separator unit of this invention uses the combination of enhanced coalescing and gravitational separation to improve the separation process and reduce the frequency of maintenance and cleaning of the unit.

14 Claims, 3 Drawing Sheets

OIL-WATER SEPARATOR

The present application claims priority based upon U.S. Provisional Application Ser. No. 60/042,465, "OIL WATER SEPARATOR," filed Mar. 31, 1997.

BACKGROUND OF THE INVENTION

This invention relates to an apparatus and method for separating oil and water, and more particularly, to a mobile oil-water separator which can be transported to a site for use. The term oil-water as use herein is intended to cover a wide range of immiscible liquids and lightweight solids. In general, the invention is applicable to the separation of immiscible liquids of different specific gravities and lightweight solids that are therefore susceptible to gravity separation.

Several approaches have been proposed for gravitationally separating oil and other materials from a liquid influent stream. Such apparatuses are installed both underground and aboveground and are adapted for oil-water runoff from rain or hose downs at gasoline service stations, truck stops, parking lots, shopping mall areas and the like. Such known apparatuses have not been completely satisfactory, mainly due to the difficulties associated with the frequent cleaning and maintenance due to clogging of the apparatus with oil and solids and the inability of the apparatus to adequately separate the immiscible liquids and solids while still maintaining a relatively compact size.

The typical method for removing liquid particles and large solid materials suspended in liquid (e.g. water) is to allow gravity, time, and distance to allow the materials to fall out of the influent stream. However, for this method to be fully effective the tank must be large enough to allow the materials sufficient time to settle out and with most compact tanks, there is not sufficient time for gravity to serve as the primary means for removal of solids. None of the prior art devices provide an effective means for separating immiscible liquids and solids from an influent stream in a compact and mobile unit requiring relatively infrequent maintenance and cleaning.

SUMMARY OF THE INVENTION

This invention provides a mobile separator, and a method therefor, which efficiently removes oils, greases and solids from a liquid influent stream which is both mobile and compact yet specifically designed to remove free floating particles and suspended solids from the influent stream and still operate at flow rates comparable to larger units.

This invention provides an apparatus for separating at least one selected medium for a liquid influent stream in which a mixture comprising, for example, water, oil, and solids is introduced to the separator tank of the invention which is pre-filled with water. The separator tank includes three processing chambers: 1) a primary oil and sediment separation chamber; 2) a secondary enhanced coalescer separation chamber and 3) an effluent discharge chamber. The influent stream enters the primary oil and sediment separation chamber where the natural gravitational forces begin the process of separating oil from the water causing the oil to begin to rise to the upper portion of the primary oil and sediment separation chamber. Next, a plurality of spaced debris plates act as a pre-coalescer unit to remove free floating solid materials (such as vegetation, aluminum cans, paper products, cigarette butts, and the like) and suspended particles from the influent. The debris plates trap and separate the solid materials and many of the larger liquid particles. The solids fall and rest on the bottom of the first chamber.

A common bulkhead separates the primary and secondary chambers. The floating oil that collects in the primary chamber, which is above the height of the interface level, is allowed to enter the secondary enhanced coalescer compartment through an upper opening in the bulkhead. This opening shall also be fitted with a screen to prevent garbage and vegetation from entering the secondary enhanced coalescer compartment. The oil that has not collected on the surface of the primary chamber must pass through a lower opening in the bulkhead plate to enter the secondary chamber coalescer compartment. Influent passing through the lower opening will be directed through the enhanced coalescer plates in the enhanced coalescer compartment.

When the influent stream reaches the secondary enhanced coalescer separation chamber it passes through a coalescer unit containing a number of closely spaced coalescer plates which act to remove the remaining oil. Because of the solids removal that occurs in the primary chamber, the coalescer plates in the secondary chamber can be placed closer together and work more efficiently than in prior art separator units. Because the plates are more closely positioned, the containment vessel is smaller in size and the resulting stream which exits the coalescer plates is cleaner than that achieved by most prior art systems.

The stream from the secondary enhanced coalescer chamber moves into the effluent discharge chamber via a pipe which draws water from a low point below the oil-water separation level in the secondary enhanced coalescer chamber and outputs that stream at a point at the top of the effluent discharge chamber. Finally, in the effluent discharge chamber, the water is discharged from the unit outlet via a pipe that draws from the lower portion of the effluent discharge chamber.

The natural force of the influent stream being introduced into the unit causes the movement of the influent stream through the chambers in the unit. Thus, the effects of turbulence within the unit are reduced, retention time is lengthened and the surface area for oil separation is increased. The oil-water separator according to this invention is capable of allowing maximum sediment settling and oil separation in a smaller unit.

It is a further object of this invention to provide oil-water separation which effectively separate immiscible liquids on a continuous basis with essentially no supervision and minimum maintenance. When maintenance is required, the separating components can be readily removed from the tank.

It is yet another object of the invention to provide a unit that can effectively remove solid materials from an influent stream in order to reduce the frequency of cleaning due to clogging.

It is another object of this invention to provide a debris plate, which allows the oil-water separator to begin collecting oil particles earlier in the separation process.

It is yet another object of the invention to provide a unit in which the coalescer units can be closely positioned so that filtering of immiscible particles is maximized.

It is another object of this invention to provide an inlet/outlet design which works in conjunction with the natural gravitational forces of the influent liquid to remove from the bottom of each chamber the portion of the liquid containing the least concentration of oil, grease and debris, thus minimizing internal piping.

It is another object of this invention to provide a mobile compact oil-water separator design that operates at flow rates comparable to larger units.

It is another object of this invention to provide an oil-water separator that is adaptable for aboveground or below grade, pumped flow or gravity-flow configurations.

In a further aspect of this invention, there is provided a method for separating at least one selected medium from a liquid influent stream. Prior to beginning the separation process each chamber in the invention is filled with water. According the method of the invention, an influent stream enters the unit through a first chamber where solids and larger particles are trapped by a series of debris plates. The solids trapped by the debris plates fall to the bottom of the unit in between the debris plates. The influent stream is then forced into a second chamber due to the natural flow of the stream through a low duct between the first and second chambers, thus moving liquid from the first to second chambers at the level below the oil-water separation level of the influent stream in the first chamber. In the second chamber, the stream is passed through a series of closely spaced coalescer plates that remove smaller particles or any remaining debris. Finally, the influent stream is moved from a low point below the oil-water separation level in the second chamber into a third chamber via a pipe which releases the stream at a high point in the third chamber. From the third chamber, the influent stream is then output from a low point in the third chamber to the outlet of the unit. This method of holding a large volume of water in each chamber through which the influent stream is introduced and continually removing the water from the bottom of the unit in each chamber allows maximum sediment settling and oil separation by reducing the effects of turbulence, lengthening retention time and increasing the surface area for oil separation.

Additional features, objects and advantages of the invention will become more evident from the following detailed description below when taken in conjunction with the following drawings.

DETAILED DESCRIPTION OF THE INVENTION

Figure 1:
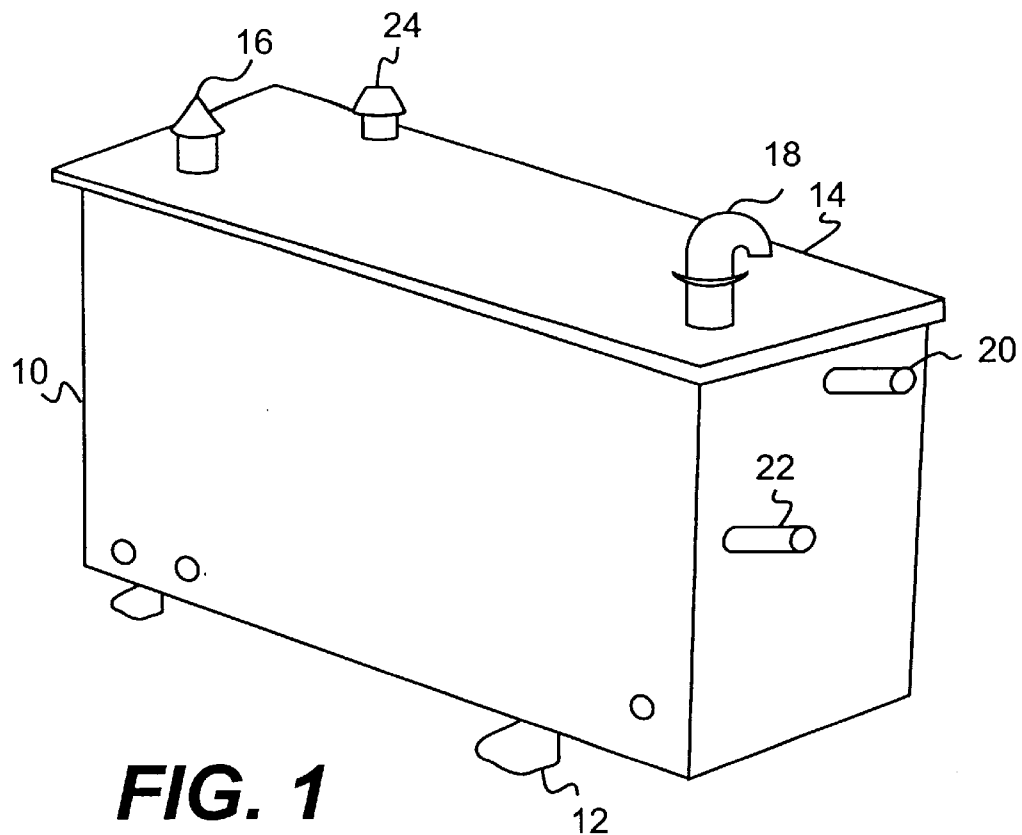
FIG. 1 is a perspective view of the oil-water separator of this invention.

As seen in FIG. 1, a oil-water separator unit 10 of this invention is preferably configured as a mobile unit supported on feet 12 that allow for convenient off-loading of the unit at a site where the unit is to be used and inspection of the underside of the unit 10 for leaks. The invention is specifically designed in accordance with the type of environment in which it will be used (e.g., surface runoff, equipment washdown, major oil spills, etc.), but the basic components remain the same with only minor adjustments that would be readily evident to those skilled in the art to adapt the unit to a specific circumstance. Thus, this disclosure provides a general description of the oil-water separator 10 which can be operated to separate free floating materials (such as vegetation, aluminum cans, paper products, cigarette butts, and the like) and suspended liquid particles (e.g. oil) from an influent stream to thereby render an effluent stream substantially free of unwanted liquid particles and solids. For purposes of this description, oil-water separation will be referred to, but those skilled in the art will understand that this invention is applicable to a wide range of immiscible liquids and solids.

With particular reference to FIG. 1, the oil-water separator 10 is a rectangular design, though the overall shape and size of the unit can be modified for the particular applications in which the apparatus is used. The oil-water separator 10 includes, a removable top 14 which provides easy access to the interior of the unit for cleaning and maintenance and various openings for access to the inside for items such as an atmospheric vent 16, an oil pump-out tube 18, an inlet 20, an outlet 22, and a emergency vent 24. The inlet 20 should be located at a point higher than the outlet 22 in order to maintain hydrostatic pressure to move fluid through the separator system. The unit also contains various top fittings for gauges, and the like (not shown) which would be known to those skilled in the art. The unit can also include a pump-mounting bracket as described in further detail below.

Figure 2:
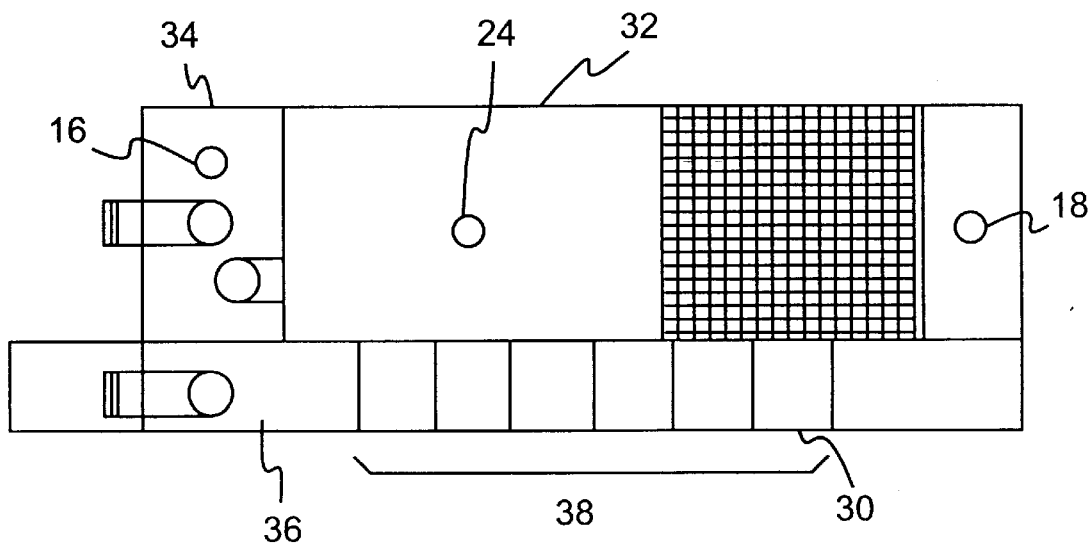
FIG. 2 is a top view of the oil-water separator of this invention.

As best shown in FIG. 2, the separator unit 10 comprises three processing chambers: a primary oil and sediment separation chamber 30, a secondary enhanced coalescer separation chamber 32, and an effluent discharge chamber 34. Prior to starting the oil-water separation process, each of the chambers in the unit is filled with water. The primary oil and sediment separation chamber 30, receives the influent stream via the inlet 20. The inlet 20 can be equipped with a pump mounting bracket (FIG. 2) which allows a pump to be mounted directly to the unit. When the influent stream enters the primary chamber 30, the initial gravitational separation of the unwanted materials from the water begins. In this area, some of the solid materials will begin to fall to the bottom of the separator unit 10. However, unlike prior art oil-water separators, this invention does not rely exclusively on gravity to remove these solids and larger particles, but instead contains a series of debris plates 38 designed to eliminate solids and larger liquid particles from the influent stream.

Figure 3:
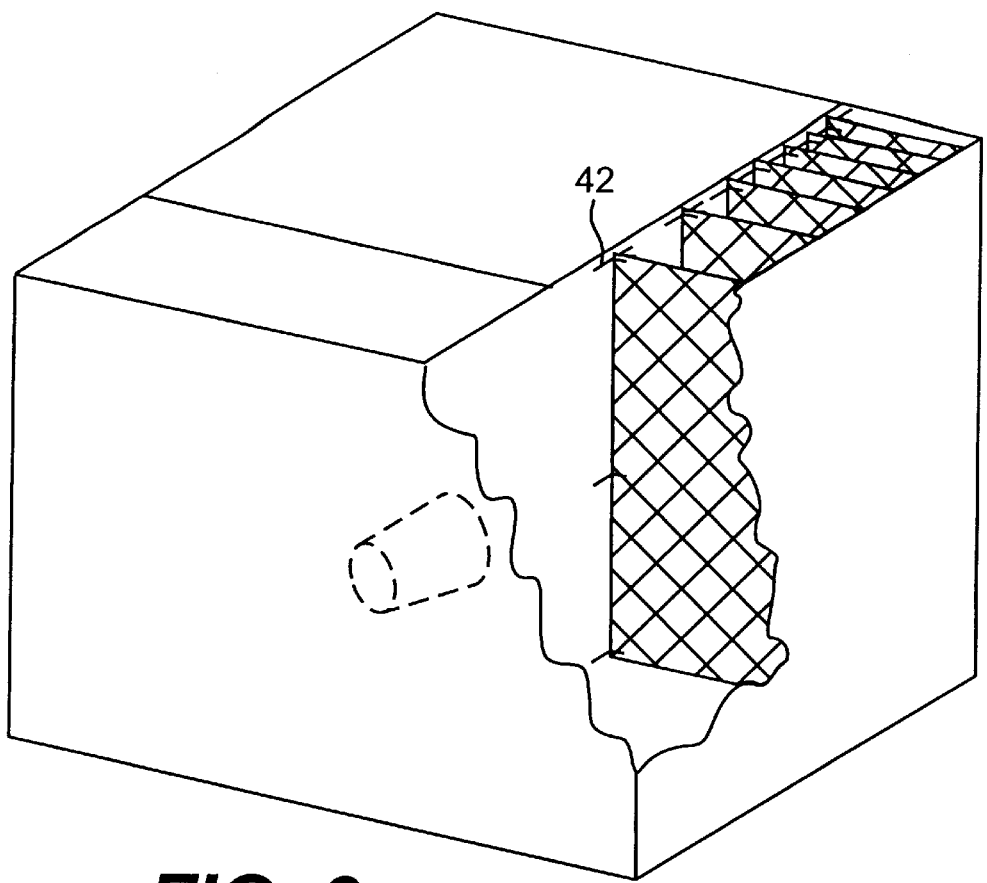
FIG. 3 is a perspective cut-away view of the right side of the invention.

The introduction of the influent stream into the primary chamber 30 causes the liquid in the primary chamber 30 to pass through the debris plates 38. The debris plates 38 are set back from the inlet 20 in order to reduce turbulence within the unit 10. As shown in FIG. 3, the debris plates 38 are made of a perforated polypropylene material which also acts as a pre-coalescer unit. The debris plates 38 fill the entire space of the primary chamber 30, i.e., the bottom and sides of the debris plates 38 contact the bottom and sides respectively of the primary chamber 30. The debris plates 38 remove larger particles and solids from the moving liquid mixture by capturing and holding the particles unable to pass through the plate's perforated surface. Additionally, the debris plates 38 have oleofilic properties which act to attract and hold oil and grease; thus, further reducing the amount of unwanted material in the influent mixture as it moves through each of the debris plates 38.

In the preferred embodiment, the debris plates have ³⁄₁₆" openings such that any solids and liquid particles of larger size are trapped by the plates such that they fall out of the influent stream and collect on the floor of the primary chamber and into a baffle 40 (FIG. 4) where they are stored and can be easily removed during regular maintenance and clean-up. However, those of ordinary skill in the art will understand that the size of the openings in the debris plates 38 many vary according to the application to which the separator unit 10 is applied.

In the preferred embodiment for a 500-gallon separator unit, seven debris plates spaced approximately 8" apart are used. However, the distance between the plates and the number of plates used will vary according the environment in which the separator unit 10 is used. For example, a particularly oily application such as a gasoline station would likely require more plates spaced more closely together than a separator unit used at a car wash. In the preferred embodiment, perforated polypropylene material is used, but those skilled in the art could adapt other similar materials to this application to achieve the same objectives.

The debris plates 38 minimize the amount of free-floating oil and solids from entering the coalescer, and thus increasing the coalescer's efficiency. Minimizing the amount of solid material and free floating oil from entering the coalescer allows a greater volume of oil to be collected from smaller particles of oil by the coalescer and thus extends the time between cleaning and oil pick-ups.

As shown in FIG. 3, the debris plates 38 are held in an upright position by a series of flanges 42. These flanges are such that the debris plates 38 can be slidably inserted and removed from the separator unit 10 for easy maintenance and cleaning. In another variation on the invention, the debris plates 38 could be a single unit held a specific distance apart by rods made of stainless steel or any other non-corrosive material. Using this variation, the debris plates are a single unit that can be removed in a single step.

Figure 4:
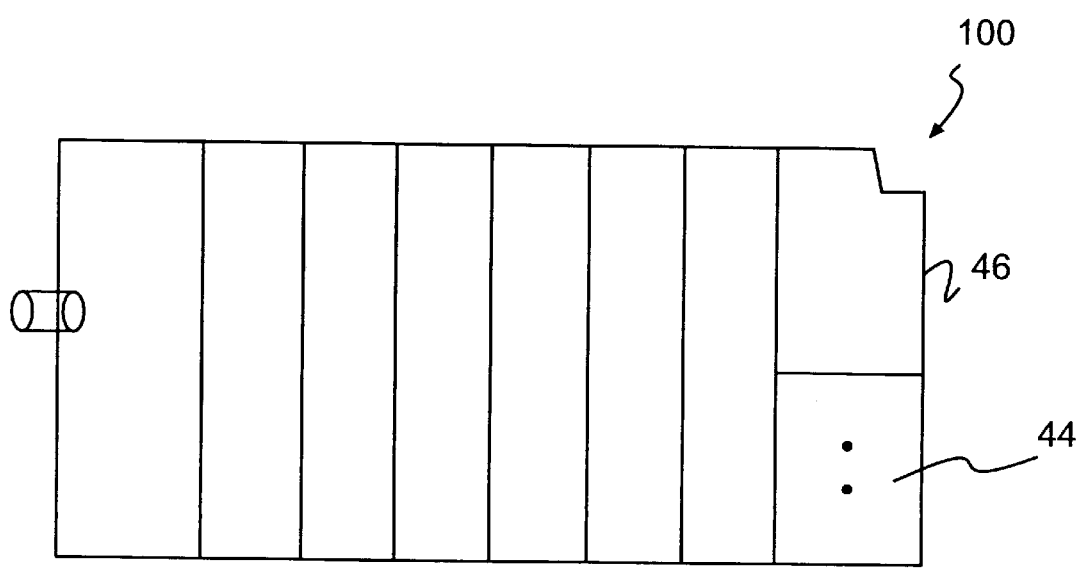
FIG. 4 is a right side view of the oil-water separator of this invention.

Turning now to FIG. 4, the primary chamber 30 is connected to the secondary enhanced coalescer separation chamber 32 via duct 44. The duct 44 is located in a sidewall 46 behind the debris plates 38. When oil begins to accumulate at the surface of the primary chamber 30, it displaces the cleansed water from the primary chamber 30 into the adjacent secondary enhanced coalescer separation chamber 32 via the duct 44. The duct 44 is a cutout opening in the sidewall 46 that separates the primary chamber 30 and secondary chamber 32. The top of the duct 44 is located below the oil-water interface in the primary chamber 30 such that the oil that has gravitated to the surface in the primary chamber 30 is transferred through notch 100 into secondary chamber 32 for later removal. Thus, the portion of the liquid mixture that moves from the primary chamber 30 to the secondary chamber 32 through duct 44 is the portion of the stream which is removed from the bottom of the preceding chamber, i.e., the portion of the stream containing the least amount of oil.

Figure 5:
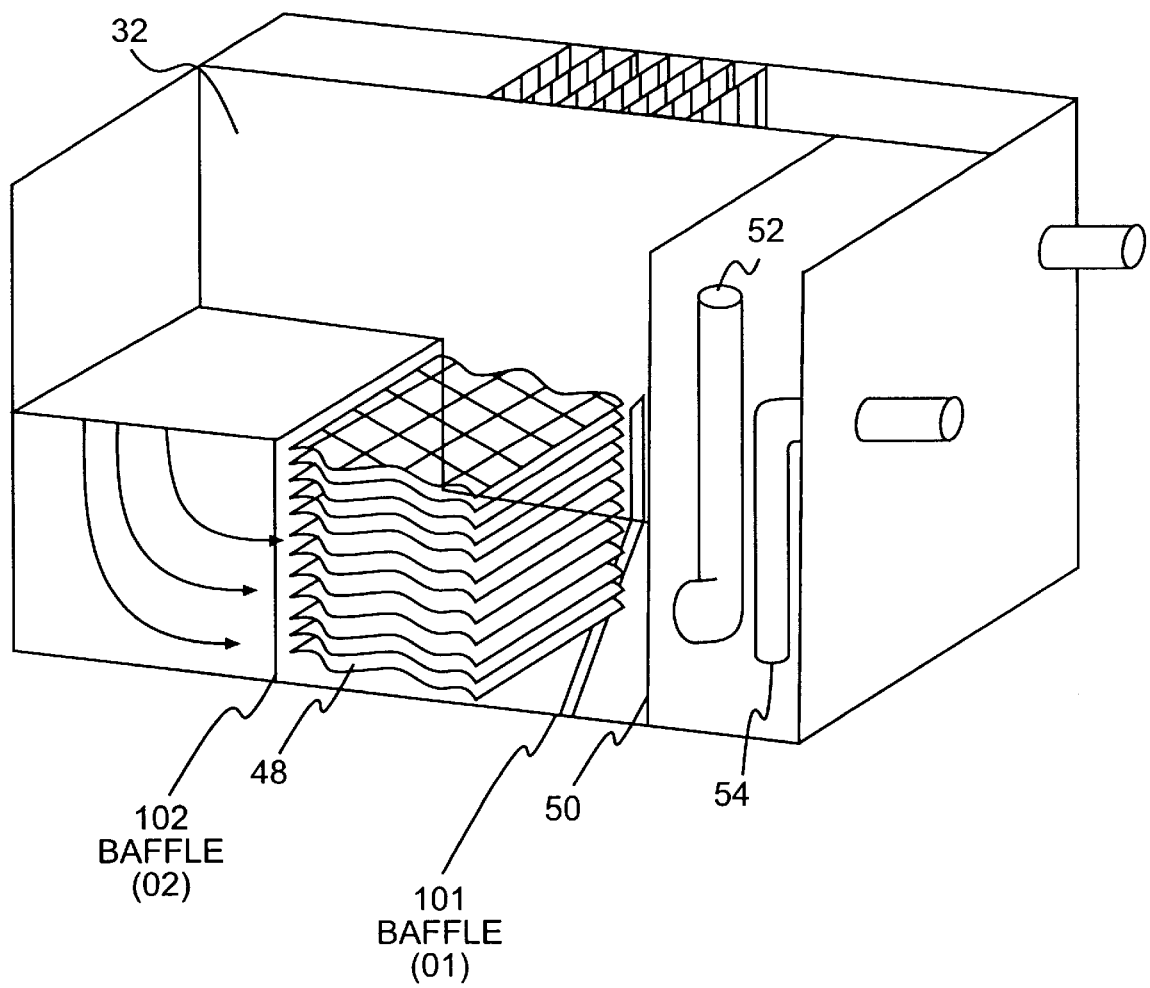
FIG. 5 is a perspective cut-away view of the left side of the invention.

As shown in FIG. 5, the liquid mixture from primary chamber 30 passes through the coalescer plates 48 in the secondary chamber 32. The coalescer plates 48 are closely spaced to provide maximum oil removal. Unlike prior art systems in which the coalescer plates had to be placed approximately 3–4 inches apart, in the preferred embodiment of this invention, the coalescer plates 48 can be placed approximately ¼ inch apart because the solid materials have already been removed in the pre-coalescing stage in the primary chamber 30. In the prior art systems, if the coalescer plates 48 were placed as closely as they are in this invention, solid material would become entrapped between the plates and the unit would clog at an unacceptable rate; thus requiring frequent cleaning. By removing solids and larger particles in the primary chamber 30, this invention can more effectively remove more oil in the secondary chamber 32 because the distance between the coalescer plates 48 can be significantly reduced. The appropriate number of coalescer plates 48 is based upon the design characteristics of the unit 10, such as flow rate, for example. Rear and front coalescer brackets (i.e., frames) are placed to the front and rear of the coalescer plates 48 to keep the coalescer plates 48 from migrating in the direction of the flow path. The two frames serve as guides for removal, insertion and orientation of the coalescer plates 48.

The preferred embodiment uses coalescer manufactured by Facet Quantek, Inc. As the moving liquid mixture passes through the coalescer plates 48, the separated oil rises to the surface and the solids fall to the bottom. Located under the coalescer is a sludge baffle (not shown) which prevents migration of settled solids.

Besides merely providing oil and solid removal using the debris plates 38 and coalescer plates 48, each of the chambers of the oil-water separator 10 is also of sufficient volume so that turbulence within the unit is minimized. The volume of the influent stream is small in comparison to the volume of liquid already contained in the chamber so movement in the liquid is reduced. This large volume of liquid already in the tank lengthens retention time of the influent stream and increases the surface area for oil separation.

Separating the secondary chamber 32 from the effluent discharge chamber 34 is a wall 50. Located in the lower portion of wall 50, below the oil-water separation level, is a first end of an effluent pipe 52. Pipe 52 allows the effluent discharge chamber 34 to move water from a low point in the secondary chamber 32 so that the water moving from the second chamber 32 to the effluent chamber 34 comes from the area in the secondary chamber 32 having the lowest concentration of oil. A second end or outlet of the effluent pipe 52 is located at the top of the effluent chamber 34.

Liquid to be released back into the environment enters a first end of an outlet pipe 54 located at the bottom of the effluent chamber 34. At this point in the process the mixture is now free from unwanted materials and is essentially a clean effluent stream. The effluent stream enters the pipe 54 and is output to the outlet 22.

According to the method of this invention, the separator unit 10 is filled with clean water prior to the introduction of the influent stream. It is the fact that the tank is initially full combined with the introduction of an influent stream into the separator unit 10 which causes the water to move through the various chambers in the unit to produce a clean effluent stream. The introduction of the influent stream displaces the water that had been standing in the unit; thus, the unit has maximized the time the water is held in the tank for purposes of gravitational separation. Also, by using the water to gently displace clean water out of the outlet 22, the amount of internal piping is reduced. Additionally, the compartmentalized design all but eliminates turbulence in the oil storage area because only a small volume of liquid in each tank is moving at any given moment while the large majority of the liquid in each chamber remains in the tank to facilitate gravitational separation. This unique long retention design in conjunction with the pre-coalescer and coalescer function combines to achieve highly efficient separation of oil and water.

The oil/water separator of this invention is capable of both continuous and intermittent flow. Additional those skilled in the art would understand that this invention can be adapted to aboveground or belowgrade, pumped flow, or gravity flow applications.

The design of the oil-water separator of this invention is such that the unit has a minimum oil storage capacity of approximately ⅓ of its total volume. Separators cease to function efficiently after oil storage exceeds the oil-water interface line.

Those persons skilled in the art will readily understand that the present invention is susceptible of broad utility and application. Many embodiments and adaptations of the present invention other than those herein described, as well as many variations, modifications and equivalent arrangements will be apparent from or reasonably suggested by the invention and the foregoing description thereof, without departing from the substance or scope of the present invention. Accordingly, while the invention has been described in detail in relation to its preferred embodiment, it is to be understood that this disclosure is only illustrative and exemplary of the invention and is made merely for purposes of providing a full and enabling disclosure of the invention. The foregoing disclosure is not intended or to be construed to limit the invention or otherwise to exclude any such other embodiments, adaptations, variations, modification and equivalent arrangements.

I claim:

1. A method of separating immiscible liquids and solids comprising the steps of:

introducing an influent stream comprising solids and immiscible liquids into a first chamber of a separator unit that has been pre-filled with water;

moving said stream in a first direction through a plurality of debris plates placed a specified distance apart in said first chamber such that said stream is directed through said debris plates to cause large oil globules and solids to be separated from said stream;

moving said stream through a duct in an internal sidewall separating said first chamber and a second chamber;

directing said stream in a second direction, wherein aid second direction is opposite to said first direction through a plurality of closely spaced coalescer plates thereby removing smaller liquid particles from the stream;

removing liquid from a lower portion of said second chamber via a pipe connecting said second chamber to a third chamber;

directing said liquid from said third chamber to an outlet to be output from said separator unit.

2. The method according to claim 1, wherein said duct in said sidewall is located in a lower portion of said sidewall below the oil-water separation in said first chamber.

3. The method of claim 1 wherein said coalescer plates are approximately ¼ inch apart.

4. The method of claim 1 wherein said debris plates are comprised of perforated oleofilic material.

5. The method of claim 1, wherein the second and third chambers have been pre-filled with water prior to introducing the influent stream comprising solids and immiscible liquids.

6. The method of claim 1, wherein the debris plates have openings, further comprising allowing solids and liquid particles trapped by the debris plates to fall out of the effluent stream.

7. The method of claim 6, further comprising removing solids and liquid particles that have fall en out of the effluent stream.

8. The method of claim 1, wherein the debris plates can be slidably removed for cleaning and maintenance.

9. A method of separating immiscible liquids comprising the steps of:

filling all chambers of a separator unit with a first liquid;

introducing an influent stream comprising at least the first liquid and a second liquid into a first chamber of the separator unit, wherein said second liquid is immiscible in said first liquid;

moving said stream in a first direction through a plurality of debris plates placed a specified distance apart in said first chamber such that said stream is directed through said debris plates to cause large globules of said second liquid to be separated from said stream;

moving said stream through a duct in an internal sidewall separating said first chamber and a second chamber;

directing said stream in a second direction, wherein said second direction is opposite to said first direction through a plurality of closely spaced coalescer plates thereby removing smaller liquid particles of said second liquid from the stream;

removing liquid from a lower portion of said second chamber via a pipe connecting said second chamber to a third chamber;

directing said liquid from said third chamber to an outlet to be output from said separator unit.

10. The method of claim 9, wherein the debris plates have openings, further comprising allowing liquid particles of said second liquid trapped by the debris plates to fall out of the effluent stream.

11. The method of claim 10, further comprising removing liquid particles of said second liquid that have fallen out of the effluent stream.

12. The method of claim 9, wherein the debris plates can be slidably removed for cleaning and maintenance.

13. The method of claim 9, wherein said debris plates are fabricated from perforated oleofilic material.

14. The of claim 9, wherein said first liquid is water, and wherein said second liquid is oil.

* * * * *